3,736,176
COMPOSITION, ARTICLES PREPARED THEREFROM AND METHOD OF PREPARING SUCH ARTICLES
Josef Francel and Fred E. Mansur, Toledo, Ohio, assignors to Owens-Illinois, Inc.
No Drawing. Continuation of application Ser. No. 671,096, Sept. 27, 1967, which is a continuation-in-part of application Ser. No. 432,877, Feb. 15, 1965, both now abandoned. This application July 21, 1971, Ser. No. 164,922
Int. Cl. C03c 17/22
U.S. Cl. 117—124 A          17 Claims

ABSTRACT OF THE DISCLOSURE

A glass surface coating composition which when heat-fused on a glass surface provides the glass surface with a protective scratch resistant and optically transparent coating in addition to providing anti-glare and high optical resolution characteristics. The coated glass surface is produced by a method comprising the steps of heat-bonding onto the glass surface an aqueous composition consisting essentially of the following constituents in the indicated range of percent by weight:

| Constituents: | Percentage by weight |
|---|---|
| Phosphoric acid | 2–23 |
| Aluminum phosphate | 5–41 | together with other beneficial constituents in the following indicated range of percentage by weight:

| Constituents: | Percentage by weight |
|---|---|
| Sodium phosphate | 0–30 |
| Ammonium phosphate | 0–10 |
| Aniline phosphate | 0–7 |
| Magnesium oxide, carbonate or nitrate | 0–7 |
| Zinc oxide, carbonate or nitrate | 0–7 |
| Aluminum halide | 0–7 |
| Iron halide | 0–7 |
| Total other beneficial constituents | $\geq 1$ |

---

This application is a continuation of formerly copending application, Ser. No. 671,096, filed Sept. 27, 1967, and now abandoned, and which in turn constituted a continuation-in-part of and was formerly copending with application Ser. No. 432,877, filed Feb. 15, 1965, and now abandoned.

This invention relates to compositions for improving the scratch resistance and anti-glare properties of a glass surface, the method of coating glass with said compositions, and the article resulting therefrom.

In the manufacture of certain glass articles, such as glass containers including beer bottles and baby food jars; scientific ware; glass building blocks; and particularly the viewing surfaces or face plates of television picture tubes, the use of a chemically durable coating which would impart scratch resistance, and anti-glare properties to the glass surface is often highly desirable. This combination of properties for a coating composition has been difficult to attain.

Accordingly, it is an object of this invention to provide a method for surface treating glass articles which method imparts scratch resistance and anti-glare properties to the glass.

Another object is to improve the surface performance characteristics of glass articles such as glass containers, laboratory and scientific ware (i.e., pipets and beakers) and television bulbs.

A further object is to provide a glass article which is scratch resistant and non-glaring in nature and yet retains its optical resolution properties within an acceptable range.

Another object is to provide a method of producing a glass surface that is low in gloss and yet essentially transparent.

A further object is to provide a method of producing a chemically durable, abrasion resistant coating on a glass surface which method can be readily incorporated into conventional glass forming techniques.

And yet another object is to provide compositions for treating glass surfaces to render than abrasion resistant, low in gloss and chemically durable.

Still further objects will be apparent from the following description.

The objects of this invention are accomplished by maintaining a glass surface or glass article at an elevated temperature, and spraying the glass surface or article with a selected aqueous phosphate solution, curing the coating onto the glass surface, and cooling to room temperature.

In carrying out the present invention, one feature resides in applying an aqueous acid aluminum phosphate solution to a glass surface while the glass surface is at a temperature of at least about 400° F. and usually at least about 650° F., and preferably about 900° F. to 1100° F., in an amount sufficient to form an integral, permanent, chemically durable, scratch resistant, low gloss coating on said glass surface.

The term "aluminum phosphate" as used herein refers to the aluminum orthophosphate family of compounds which includes aluminum phosphate ($AlPO_4$), aluminum monohydrogen phoshpate [$Al_2(HPO_4)_3$], and aluminum dihydrogen phosphate [$Al(H_2PO_4)_3$], and to mixture of two or more of these.

Representative of the aluminum phosphate compounds which can be employed in Alkophos "C" which is the trademark of a commercially available colloidal liquid aluminum phosphate compound and which is essentially an acidic solution of the compound having the empirical formula of $Al_2O_3 \cdot 3P_2O_5$ and described by the manufacturer thereof as follows:

| | |
|---|---|
| Mol. wt. | 318 |
| $P_2O_5$ percent | 33.1 |
| $Al_2O_3$ do | 8.5 |
| Sp. gr. (25/15–5° C.) | 1.4 |
| pH 1% soln. | 2.6 |
| Visc. at 25° C. cps | 35–90 |
| Free acidity as $H_3PO_4$ percent | 6.8 |
| Solubility | 50–70 |
| Melting point, ° C. | 1500–1800 |

The close relationship of monoaluminum phosphate, $Al(H_2PO_4)_3$, and Alkophos "C" with respect to composition is shown in the following table.

| | Monoaluminum phosphate, percent | Alkophos "C," percent |
|---|---|---|
| $Al_2O_3$ | 8.0 | 8.6 |
| $P_2O_5$ | 33.7 | 33.1 |

In addition to aluminum phosphate the aqueous aluminum phosphate solutions used in practicing the present invention also contain a minor amount of certain soluble compounds of sodium, magnesium, zinc, ammonium, aniline, iron and aluminum. By soluble compounds are meant those compounds that are soluble in the phosphoric acid and aluminum phosphate solution.

The term "sodium phosphate," as used herein, refers to trisodium phosphate. Other suitable sodium phosphate salts include tetrasodium pyrophosphate, sodium acid pyrophosphate, sodium tetrametaphosphate, and sodium tripolyphosphate.

The function of these solution components will be briefly discussed. The primary ingredient is aluminum phosphate. It has been found that the acid aluminum phosphate solution forms a permanent coating when applied to a glass substrate according to the present methods. The "phosphate" of the solution is responsible for the permanent bonding with the glass substrate. It has been found, however, that a phosphate coating, in and of itself is highly opaque and low in chemical durability, low in optical resolution and low in abrasion resistance.

The "aluminum" content of the solution tends to increase the chemical durability and adds structural integrity to the coating. While solutions containing only water, aluminum phosphate and phosphoric acid will form a coating on glass surfaces, these coatings are quite opaque, and have low scratch resistance and poor chemical durability. It is therefore required that certain other modifying ingredients be present in the solution if satisfactory scratch resistance, optical resolution, chemical durability and anti-glare properties are to be achieved. Aqueous phosphate solutions having the solute compositions set forth below are suitable for the present purposes.

Solute component:  Operative range percent by weight
- (A) Aluminum phosphate _____ 5–41
- (B) Phosphoric acid _____ 2–23
- (C) Sodium phosphate _____ 0–30
- (D) Ammonium phosphate _____ 0–10
- (E) Aniline phosphate _____ 0–7
- (F) Magnesium oxide, carbonate or nitrate __ 0–7
- (G) Zinc oxide, carbonate or nitrate _____ 0–7
- (H) Aluminum halide _____ 0–7
- (I) Iron halide _____ 0–7

Wherein $C+D+E+F+G+H+I \geq 1$
Wherein the total solute concentration is in the range of 25–55%.

In the above solutions the solvent is usually water in the range of 45–75%, although non-interfering, non-aqueous solvents can also be added if desired as long as the solvent remains essentially aqueous.

The treating solution within the above range can be further subdivided according to the specific requirements of the particular coating application. For instance, in the treatment of television face plates and in the treatment of glass containers where abrasion resistant, low gloss coatings are required, compositions within the following range are employed.

| Component | Broad range, percent by wt. | Preferred range, percent |
|---|---|---|
| Water | 45–75 | 50–65 |
| Phosphoric acid | 2–23 | 2–23 |
| Aluminum phosphate | 5–41 | 15–35 |
| Phosphate compound selected from the group consisting of sodium phosphate, aniline phosphate and ammonium phosphate | 2–30 | 2–10 |

In these solutions the phosphates of sodium, aniline and ammonium act as fluxing agents in that they enhance the abrasion resistance, coating uniformity and surface lubricity.

An especially preferred range of compositions for treating glass surfaces such as television face plates to provide optical resolution coupled with good abrasion resistance and anti-glare properties has the following range of components:

Component: Percent (weight)
- Water _____ 52.5–59.5
- Phosphoric acid _____ 11.8–13.5
- Aluminum phosphate _____ 23.5–30.5
- Sodium phosphate _____ 2.5–5.5

The effectiveness of solutions within the above described classes is demonstrated in Examples 1 through 6.

When the coated glass surface is required to have good anti-glare properties (e.g. low gloss) and good alkaline durability, acid aluminum phosphate solutions containing zinc or magnesium ions are particularly effective. The magnesium or zinc ions are introduced into the aluminum phosphate solution by dissolving any non-interfering, soluble zinc or magnesium compound. By non-interfering, compound is meant that the anion of compound does not interfere with the formation of the glass surface coating. It has been found that the oxides, carbonates and nitrates of magnesium and zinc are not interfering and are particularly useful in practicing the present invention.

Operative ranges for this class of aqueous phosphate solutions include

| Component | Broad range, percent | Preferred range, percent |
|---|---|---|
| Water | 45–75 | 50–65 |
| Phosphoric acid | 2–23 | 11–18 |
| Aluminum phosphate | 5–40 | 15–30 |
| Compound selected from the group consisting of the oxides, carbonate and nitrates of magnesium and zinc | 1–9 | 2–6 |

Typical application for the above compositions include coatings for light fixtures, diffusion shields and glass construction blocks.

The effectiveness of the aqueous phosphate solutions within the above described class is demonstrated in Examples 7 through 13.

In practicing the present invention, the aqueous phosphate solutions are applied to the glass surface at elevated temperatures. The coating is then thermally fused onto the glass surface so as to form a permanent bond. The glass surface temperature is in the range of about 400° F. to about 1100° F. when the treating solution is applied. At this temperature the solvent (water) is vaporized and the coating is deposited on the surface. When the solution is applied at temperatures below 650° F., the temperature of the glass surface is raised to a temperature of about 650° F. to about 1100° F., and maintained at this temperature for a time sufficient to permanently fuse the phosphate coating onto the glass surface. This fusion can usually be accomplished in a time period ranging from about 1 minute to about 30 minutes with the higher temperatures requiring the shorter time periods. This permanent fusion of the phosphate coating onto the glass surface is a result of a chemical dehydration reaction that occurs between the phosphate coating and the glass surface at temperatures of 650° F. and above. This chemical dehydration occurs more rapidly at temperatures of about 900° F. to about 1100° F. It is important that the treating solution is in fact a true solution. Dispensing suspensions, slurries, pastes etc. are not satisfactory since they do not form uniform, homogeneous coatings.

When conditions permit, it is desirable to apply the aqueous phosphate solution to the glass surface at temperatures above 650° F. and preferably at temperatures of about 900–1100° F., so that the coating is immediately permanently bonded to the glass surface. Under these conditions, care should be exercised to avoid thermal shocking the glass article.

The present process can be conveniently incorporated into conventional glass forming techniques. For example, the phosphate coating can be applied by spraying the aqueous phosphate solution onto the surface of commercial glass articles such as television bulbs, or glass containers immediately after these articles are formed but prior to their annealing. Under these conditions, the residual forming heat serves to fuse the coating permanently to the glass surface.

One technique for applying the phosphate solutions to glass articles is set forth in the following examples.

EXAMPLE 1

A glass article in the form of television tube face plate was heated in a gas fired furnace at a temperature of 900° F. for 5 minutes. This elevated temperature resulted in producing a glass surface temperature of 650° F. The face plate was removed from the furnace and placed on a conveyor belt that passed under spray guns, from which solution Composition A (Table I) was being sprayed under a line pressure of 80 lbs. per sq. in. and a fluid container pressure of 10 lbs. per sq. in. The face plate was then cured in a furnace at 900° F. for 3 minutes. The face plate was thereafter annealed in a furnace at 600° F., and then slowly cooled to room temperature.

EXAMPLES 2-13

The same procedure as set forth in Example 1 was followed except Compositions C through N (Table I), respectively were used in Examples 2-13.

Each of the glass articles treated in Examples 1-13 was subjected to a series of optical, mechanical and chemical tests to determine surface reflectance properties, optical resolution, abrasion resistance and chemical durability. These test results are set forth in Table II.

A brief description of the testing procedures which were used in evaluating (1) resolution, (2) glossiness (or anti-glare), (3) scratch resistance (S.R.) and (4) resistance to chemical attack is set forth below.

Resolution (1) was determined by using a ¼ size NBS chart with the measurements read directly from the chart in accordance with NBS Circular No. 533–1952 entitled, "Determining the Resolving Power of Photographic Lenses." Higher readings indicate better resolution and the resolving power of about 220 lines/square inch and above are considered satisfactory.

A Gardner Laboratories 20° Gloss-meter (2) was used to measure glossiness or reflectance and was set to read 8.0 against Gardner White Standard No. 2722. The reading of 10 or less indicates that the surface has desirable anti-glare properties.

Scratch resistance or S.R. (3) was measured by an apparatus consisting of a pointed carbide tip attached to a pivoted arm on top of which weights can be inserted. The coated glass surface was slowly pulled forward and additional weights were added after each pass. When the carbide tip produced a scratch on the coated surface this weight was recorded. For the purposes of comparison, the weight required for scratching an uncoated glass surface was about 700 grams.

Chemical resistance (4) was tested by immersing each of the coated glass samples in water solutions of 1.0 M $H_2SO_4$, 1% NaOH, and 1% "Tide" each at 50° C. and the time required for removal of the coatings was noted. This resistance to chemical attack is critical since a coating which has excellent anti-glare and scratch resistance properties should retain this coating upon exposure to common acidic and basic solutions. From Table II it will be readily apparent that the coating compositions and glasses coated therewith exhibit excellent scratch resistance and anti-glare properties coupled with good optical resolution.

"Tide" is the trademark of a well-known detergent of the alkali-metal, alkyl-sulfate type which is further described in U.S. Pat. No. 2,486,921.

In all of the examples the strength of the phosphoric acid was 85.6%.

Tables I and II, following, respectively set forth the compositions and the physical properties for Examples 1-13, inclusive.

TABLE I

| Component | A (Ex. 1) | B | C (Ex. 2) | D (Ex. 3) | E (Ex. 4) | F (Ex. 5) | G (Ex. 6) |
|---|---|---|---|---|---|---|---|
| Water | 56.0 | 45.3 | 57.8 | 59.5 | 62.0 | 57.4 | 59.6 |
| Phosphoric acid | 12.5 | 9.1 | 6.1 | 4.0 | 7.1 | 2.1 | 2.2 |
| Aluminum phosphate* | 27.5 | 15.6 | 30.0 | 31.0 | 26.8 | 30.6 | 32.1 |
| Sodium phosphate | 4.0 | 30.0 | 6.1 | | | | |
| Ammonium phosphate | | | | | 5.5 | | 9.9 |
| Aniline phosphate ($C_6H_5NH_3PO_4$) | | | | | 4.1 | | 6.1 |
| Magnesium nitrate | | | | | | | |
| Magnesium oxide | | | | | | | |
| Zinc carbonate | | | | | | | |
| Zinc nitrate | | | | | | | |

| Component | H (Ex. 7) | I (Ex. 8) | J (Ex. 9) | K (Ex. 10) | L (Ex. 11) | M (Ex. 12) | N (Ex. 13) |
|---|---|---|---|---|---|---|---|
| Water | 57.2 | 58.6 | 53.4 | 66.4 | 57.3 | 46.2 | 55.0 |
| Phosphoric acid | 12.3 | 12.2 | 17.2 | 15.0 | 12.6 | 11.3 | 11.7 |
| Aluminum phosphate* | 24.5 | 25.3 | 27.7 | 16.3 | 25.1 | 40.1 | 28.9 |
| Sodium phosphate | | | | | | | |
| Ammonium phosphate | | | | | | | |
| Aniline phosphate ($C_6H_5NH_3PO_4$) | | | | | | | |
| Magnesium nitrate | 6.0 | 3.9 | | | | | |
| Magnesium oxide | | | 1.7 | 2.3 | | 2.4 | |
| Zinc carbonate | | | | | 5.0 | | |
| Zinc nitrate | | | | | | | 4.4 |

* Monoaluminum phosphate.

TABLE II

| Compounds | Optical resolution (1), lines/sq. in. | Gloss-meter (2) | Mechanical S.R. (3), (g.) | Chemical (4) 1.0 M NaOH, 1.3 | 1% NaOH, pH 12 | 1% Tide, pH 8 |
|---|---|---|---|---|---|---|
| Ex. 1 | 224+ | 3.4 | 1,700 | 12 hrs | 80 min | 4 hrs. |
| Ex. 2 | 224 | 3.4 | 1,800 | 12 hrs | 95 min | 5½ hrs. |
| Ex. 3 | 192 | 4.4 | 1,550 | 14 hrs | 3.5 hrs | 28 hrs. |
| Ex. 4 | 224 | 3.7 | 1,500 | 11 hrs | 4 hrs | 25½ hrs. |
| Ex. 5 | 320 | 2.3 | 2,700 | 5 hrs | 85 min | 5 hrs., 40 min. |
| Ex. 6 | 224 | 2.8 | 2,000 | 3 hrs | 30 min | 5 hrs. |
| Ex. 7 | 84 | 1.4 | 1,300 | 7½ hrs | 1½ hrs | 5 hrs. |
| Ex. 8 | 96 | | 1,300 | 7½ hrs | 1½ hrs | 5½ hrs. |
| Ex. 9 | 84 | 1.8 | | | 2½ hrs | 11 hrs. |
| Ex. 10 | 224 | 4.4 | 1,700 | 14 hrs | 4 hrs | 27 hrs. |
| Ex. 11 | 224 | 4.2 | 1,600 | 12 hrs | 3 hrs | 24 hrs. |
| Ex. 12 | 84 | *1.0 | 1,350 | | | |
| Ex. 13 | 192 | 4.0 | 1,500 | 8 hrs | 40 min | 3½ hrs. |

*Opaque.

Certain variations in the glass coating compositions can be made, such as the substitution of other alkali phosphates, for example, sodium pyrophosphate, for the phosphoric acid or sodium phosphate.

The data in Table II indicates that the coated glass articles prepared in Examples 1-6 exhibit excellent abrasion resistance and excellent anti-glare properties while the articles produced in Examples 7-13 have excellent anti-glare properties in conjunction with good alkaline durability.

In certain applications including scientific ware such as beakers and pipets where prolonged exposure to chemical reactants is common, exceptional chemical durability and abrasion resistance is required. It has been found that the application of a phosphate coating containing certain metal halide salts form a particularly durable, abrasion resistant coating.

These solutions comprise in percent by weight:

| Component: | Range, percent |
|---|---|
| Water | 50-65 |
| Phosphoric acid | 2-23 |
| Aluminum phosphate | 5-41 |
| Compound selected from the group consisting of halide salts of aluminum and iron | 2-7 |

The halide salts include aluminum chloride, aluminum bromide, aluminum iodide, as well as ferrous and ferric chlorides, bromides and iodides. The use of these solutions is demonstrated in the following examples.

EXAMPLE 14

Several ordinary borosilicate glass pipets were preheated in a laboratory oven at 900° F. for several minutes. They were then removed from the oven and sprayed with a phosphate solution of the following composition:

| | Percent |
|---|---|
| Water | 52.4 |
| Phosphoric acid | 8.4 |
| Aluminum chloride | 5.2 |
| Monoaluminum phosphate | 34.0 |

The coated pipets were then further cured at 1100° F. for about 1 minute to assure the coating had become permanently bonded. At the end of this heat treatment a permanent, integral phosphate coating was present on each pipet.

The coating was evaluated and these coated pipets were superior to untreated pipets in their glass-to-glass abrasion resistance.

The coated pipets were immersed for prolonged periods (simulating 5 years of normal usage) in an ordinary detergent solution similar to that used to clean pipets in normal laboratory use. The coated pipets were observed to be superior in chemical durability to this detergent solution than ordinary uncoated pipets.

EXAMPLE 15

Several 400 ml. borosilicate beakers were preheated in a furnace at 1100° F. The beakers were then removed and sprayed with a phosphate solution comprising:

| | Percent |
|---|---|
| Water | 59.4 |
| Phosphoric acid | 10.4 |
| Ferric chloride | 4.7 |
| Aluminum phosphate | 25.2 |

The spray gun was about 6 to 8 inches from the beaker during the spray application. The atomizer pressure was about 80 p.s.i.g. and the spray pattern was adjusted to achieve maximum atomization.

After spraying, the beakers were returned to the furnace at 1100° F. for an additional 2 minutes to assure a permanent coating had been formed. The beakers were then annealed.

The scratch resistance was then evaluated by the method used in Examples 1 through 13 except that a quartz tip was used in place of the carbide tip. The coated beakers were observed to scratch at about 2500 gms., while uncoated beakers scratched at about 300 gms. This indicates that the scratch resistance was increased about eightfold by the above treatment.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the description set forth herein but rather that the claims be construed as encompassing all the features and patentable novelty which reside in the present invention including all features which would be treated as equivalents thereof by those skilled in the art to which the invention pertains.

We claim:

1. A method of treating the major surface of a shaped glass article selected from the group consisting of television face plates, glass containers, light fixtures, diffusion shields and glass blocks to render said surface chemically durable, abrasion-resistant and low in gloss without materially impairing the transparency thereof which comprises the steps of:
   (1) adjusting the temperature of the glass surface to within the range of from about 400° F. to about 1100° F.,
   (2) applying to said surface, while within said temperature range, an essentially aqueous phosphate solution comprising essentially:
      (a) 45-75 percent by weight of water,
      (b) 5-41 percent by weight of aluminum phosphate,
      (c) 2-23 percent by weight of phosphoric acid, and, additionally, at least one percent (1%) by weight of at least one of the compounds selected from the group consisting of:
      (d) a phosphate of sodium, ammonium or aniline with the proviso that sodium phosphate not exceed 30 weight percent, ammonium phosphate not exceed 10 weight percent and aniline phosphate not exceed 7 weight percent,
      (e) an oxide, carbonate or nitrate of magnesium or zinc with the proviso that the amount thereof not exceed 7 weight percent,
      (f) a halide of aluminum or iron with the proviso that the amount thereof not exceed 7 weight percent and
   (3) heat fusing said applied coating onto said surface at a temperature within the range of from about 650° F. to about 1100° F. for a time sufficient to form a permanent, integral coating thereon.

2. The method of claim 1, wherein said phosphate solution consists essentially of:

| | Percent |
|---|---|
| Water | 45-75 |
| Phosphoric acid | 2-23 |
| Aluminum phosphate | 5-41 |
| Phosphate selected from the group consisting of sodium phosphate, aniline phosphate and ammonium phosphate | 2-30 |

3. The method of claim 2, wherein said phosphate solution consists essentially of:

| | Percent |
|---|---|
| Water | 50-65 |
| Phosphoric acid | 2-23 |
| Aluminum phosphate | 15-35 |
| Phosphate selected from the group consisting of sodium phosphate, aniline phosphate and ammonium phosphate | 2-10 |

4. The method of treating a television tube face plate to render said face plate abrasion-resistant and low in gloss, comprising the steps of:

maintaining said face plate at a temperature in the range of about 400° F. to about 1100° F., applying an aqueous phosphate solution to said surface to deposit a coating on said face plate, said solution consisting essentially of:

| | Percent |
|---|---|
| Water | 52.5–59.5 |
| Phosphoric acid | 11.8–13.5 |
| Aluminum phosphate | 23.5–30.5 |
| Sodium phosphate | 2.5–5.5 | and heat-fusing said coating onto said surface at a temperature in the range of about 650° F. to about 1100° F. for a time sufficient to form a permanent, integral low gloss, abrasion-resistant coating thereon.

5. The method of claim 4, wherein said solution is applying by spraying said face plate after forming and prior to annealing thereof, whereby the coating is simultaneously deposited and heat-fused under the influence of the forming heat retained by said face plate.

6. The method of claim 1, wherein said phosphate solution consists essentially of:

| | Percent |
|---|---|
| Water | 45–75 |
| Phosphoric acid | 2–23 |
| Aluminum phosphate | 5–40 |
| Compound selected from the group consisting of the oxides, carbonates and nitrates of magnesium and zinc | 1–9 |

7. The method of claim 6, wherein said solution consists essentially of:

| | Percent |
|---|---|
| Water | 50–65 |
| Phosphoric acid | 11–18 |
| Aluminum phosphate | 15–30 |
| Compound selected from the group consisting of the oxides, carbonates and nitrates of magnesium and zinc | 2–6 |

8. The method of claim 1, wherein said phosphate solution consists essentially of:

| | Percent |
|---|---|
| Water | 50–65 |
| Phosphoric acid | 2–23 |
| Aluminum phosphate | 5–41 |
| Compound selected from the group consisting of the halide salts of aluminum and iron | 2–7 |

9. The method of claim 8, wherein said phosphate solution is deposited on said glass article at a temperature of about 900° F. and heat-fused at about 1100° F.

10. The method of claim 1, wherein said solution is applied by spraying said article after forming and prior to annealing thereof whereby the coating is simultaneously deposited and cured under the influence of the forming heat retained by said article.

11. A shaped glass article selected from the group consisting of television face plates, glass containers, light fixtures, diffusion shields and glass blocks characterized in having a major surface bearing heat-fused thereon a permanent, scratch-resistant, chemically-durable coating, said coating as applied comprising essentially:

(a) 45–75 percent by weight of water,
(b) 5;41 percent by weight of aluminum phosphate,
(c) 2–23 percent by weight of phosphoric acid, and, additionally at least one percent (1%) by weight of at least one of the compounds selected from the group consisting of:

(d) a phosphate of sodium, ammonium or aniline with the proviso that sodium phosphate not exceed 30 weight percent, ammonium phosphate not exceed 10 weight percent and aniline phosphate not exceed 7 weight percent, (e) an oxide, carbonate or nitrate of magnesium or zinc with the proviso that the amount thereof not exceed 7 weight percent, and (f) a halide of aluminum or iron with the proviso that the amount thereof not exceed 7 weight percent, said coating being essentially devoid of water due to vaporization during fusion.

12. A shaped glass article as defined in claim 11, wherein said surface coating consists essential of the following constituents in the indicated relative parts by weight:

| Constituents: | Relative parts by weight |
|---|---|
| Phosphoric acid | 2–23 |
| Aluminum phosphate | 5–41 |
| Phosphate selected from the group consisting of sodium phosphate, aniline phosphate and ammonium phosphate | 2–30 |

13. A shaped glass article as defined in claim 11, wherein said surface coating consists essentially of the following constituents in the indicated relative parts by weight:

| Constituents: | Relative parts by weight |
|---|---|
| Phosphoric acid | 2–23 |
| Aluminum phosphate | 15–35 |
| Phosphate selected from the group consisting of sodium phosphate, aniline phosphate and ammonium phosphate | 2–10 |

14. A shaped glass article as defined in claim 11, wherein said surface coating consists essentially of the following constituents in the indicated relative parts by weight:

| Constituents: | Relative parts by weight |
|---|---|
| Phosphoric acid | 11.8–13.5 |
| Aluminum phosphate | 23.5–30.5 |
| Sodium phosphate | 2.5–5.5 |

15. A shaped glass article as defined in claim 11, wherein said surface coating consists essentially of the following constituents in the indicated relative parts by weight:

| Constituents: | Relative parts by weight |
|---|---|
| Phosphoric acid | 2–23 |
| Aluminum phosphate | 5–40 |
| Compound selected from the group consisting of the oxides, carbonates and nitrates of magnesium and zinc | 1–9 |

16. A shaped glass article defined in claim 11, wherein said surface coating consists essentially of the following constituents in the indicated relative parts by weight:

| Constituents: | Relative parts by weight |
|---|---|
| Phosphoric acid | 11–18 |
| Aluminum phosphate | 15–30 |
| Compound selected from the group consisting of the oxides, carbonate and nitrates of magnesium and zinc | 2–6 |

17. A shaped glass article as defined in claim 11, wherein said surface coating consists essentially of the following constituents in the indicated relative parts by weight:

| Constituents: | Relative parts by weight |
|---|---|
| Phosphoric acid | 2–23 |
| Aluminunm phosphate | 5–41 |
| Compound selected from the group consisting of the halide salts of aluminum and iron | 2–7 |

References Cited

UNITED STATES PATENTS

| 3,059,046 | 10/1962 | Westervelt et al. | 174—110 |
| 2,979,108 | 4/1961 | Thompson | 154—2.6 |
| 3,082,133 | 3/1963 | Hofmann et al. | 154—2.6 |
| 3,301,701 | 1/1967 | Baker et al. | 117—124 X |
| 3,325,662 | 6/1967 | Cook | 117—124 X |
| 3,326,715 | 6/1967 | Twells | 117—124 X |

ALFRED L. LEAVITT, Primary Examiner

C. WESTON, Assistant Examiner

U.S. Cl. X.R.

106—286; 117—169 R

UNITED STATES PATENT AND TRADEMARK OFFICE
CERTIFICATE OF CORRECTION

PATENT NO. : 3,736,176
DATED : May 29, 1973
INVENTOR(S) : Francel and Mansur

It is certified that error appears in the above-identified patent and that said Letters Patent are hereby corrected as shown below:

Col. 2, line 31, change "phoshpate" to --phosphate--. Col. 9, line 22, change "applying" to --applied--; line 73, ";" should be --(-)--. Col. 10, line 18, "essential" should be --essentially--. Col. 10, line 64, after "article" insert --as--; line 73, change "carbonate" to --carbonates--.

Signed and Sealed this

Twenty-sixth Day of April 1977

[SEAL]

Attest:

RUTH C. MASON
Attesting Officer

C. MARSHALL DANN
Commissioner of Patents and Trademarks